United States Patent
Liew et al.

(10) Patent No.: US 8,988,810 B1
(45) Date of Patent: Mar. 24, 2015

(54) TRACK MEASUREMENT FOR DATA STORAGE DEVICE

(71) Applicant: Western Digital Technologies, Inc., Irvine, CA (US)

(72) Inventors: Yee Ching Liew, Irvine, CA (US); Jinghuan Chen, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/294,061

(22) Filed: Jun. 2, 2014

Related U.S. Application Data

(60) Provisional application No. 61/980,472, filed on Apr. 16, 2014.

(51) Int. Cl.
*G11B 5/09* (2006.01)
*G11B 27/36* (2006.01)
*G11B 20/18* (2006.01)

(52) U.S. Cl.
CPC .................. *G11B 20/1816* (2013.01)
USPC .............................................. 360/53; 360/31

(58) Field of Classification Search
CPC ........ G11B 27/36; G11B 5/012; G11B 20/18; G11B 2220/20
USPC ............. 360/53, 54, 55, 73.13, 75, 77.01, 31, 360/60, 77.04; 369/47.5, 47.51, 47.52, 369/47.53, 116
See application file for complete search history.

(56) References Cited

U.S. PATENT DOCUMENTS

| | | | |
|---|---|---|---|
| 6,018,789 | A | 1/2000 | Sokolov et al. |
| 6,065,095 | A | 5/2000 | Sokolov et al. |
| 6,078,452 | A | 6/2000 | Kittilson et al. |
| 6,081,447 | A | 6/2000 | Lofgren et al. |
| 6,092,149 | A | 7/2000 | Hicken et al. |
| 6,092,150 | A | 7/2000 | Sokolov et al. |
| 6,094,707 | A | 7/2000 | Sokolov et al. |
| 6,105,104 | A | 8/2000 | Guttmann et al. |
| 6,111,717 | A | 8/2000 | Cloke et al. |
| 6,145,052 | A | 11/2000 | Howe et al. |
| 6,175,893 | B1 | 1/2001 | D'Souza et al. |
| 6,178,056 | B1 | 1/2001 | Cloke et al. |
| 6,191,909 | B1 | 2/2001 | Cloke et al. |
| 6,195,218 | B1 | 2/2001 | Guttmann et al. |
| 6,205,494 | B1 | 3/2001 | Williams |
| 6,208,477 | B1 | 3/2001 | Cloke et al. |
| 6,223,303 | B1 | 4/2001 | Billings et al. |
| 6,230,233 | B1 | 5/2001 | Lofgren et al. |
| 6,246,346 | B1 | 6/2001 | Cloke et al. |
| 6,249,393 | B1 | 6/2001 | Billings et al. |
| 6,256,695 | B1 | 7/2001 | Williams |

(Continued)

*Primary Examiner* — Nabil Hindi

(57) ABSTRACT

Track placement on a disk of a Data Storage Device (DSD) including writing test data in a plurality of sectors in a test track on the disk. An adjacent track on the disk is written offset from the test track by an offset distance. Data is read from the test track from an Off-Track Read Capability (OTRC) position outside of the test track. An OTRC value is determined for each sector of the plurality of sectors by varying the OTRC position and determining whether the sector meets a criterion for correctly reading data from the sector. An average OTRC value and a standard deviation are calculated for the plurality of sectors. If it is determined that the average OTRC value is greater than or equal to the predetermined multiple of the standard deviation of the OTRC values, the adjacent track is rewritten at a decreased offset distance.

23 Claims, 7 Drawing Sheets

(56) References Cited

U.S. PATENT DOCUMENTS

| | | |
|---|---|---|
| 6,262,857 B1 | 7/2001 | Hull et al. |
| 6,263,459 B1 | 7/2001 | Schibilla |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,771,441 B2 | 8/2004 | Tang et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,785,084 B2 | 8/2004 | Szita |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,155 B2 | 3/2005 | Yang et al. |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |

(56) References Cited

U.S. PATENT DOCUMENTS

| | | | |
|---|---|---|---|
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,525,754 B2 * | 4/2009 | Melrose et al. ............ 360/77.04 |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,639,447 B1 | 12/2009 | Yu et al. |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,663,835 B1 | 2/2010 | Yu et al. |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,125,723 B1 | 2/2012 | Nichols et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |

(56) References Cited

U.S. PATENT DOCUMENTS

| | | |
|---|---|---|
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | Deforest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 8,837,065 B1 | 9/2014 | Mircea et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

\* cited by examiner

TRACK MEASUREMENT FOR DATA STORAGE DEVICE

CROSS-REFERENCE TO RELATED APPLICATION(S)

This application claims the benefit of U.S. Provisional Application No. 61/980,472, filed on Apr. 16, 2014, which is hereby incorporated by reference in its entirety.

BACKGROUND

Data Storage Devices (DSDs) are often used to record data onto or to reproduce data from a storage media. One type of storage media includes a rotating magnetic disk. A magnetic head of the DSD can magnetically read and write data in tracks on a surface of the disk.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Shingled Magnetic Recording (SMR) has recently been introduced as a way of increasing the amount of data that can be stored in a given area on the disk by increasing the number of Tracks Per Inch (TPI) with narrower tracks. SMR increases TPI by using a relatively wide write element of the head with a stronger magnetic field to overlap tracks like roof shingles. The non-overlapping portion then serves as a narrow track that can be read by a read element of the head.

Although a higher number of TPI is ordinarily possible with SMR, the stronger magnetic field of the write element and the closer proximity of tracks can worsen Adjacent Track Interference (ATI) which occurs when data already stored on the disk becomes corrupted due to the magnetic field from writing new data in adjacent tracks. During a product development phase or as part of a manufacturing process, certain track measurement tests may be performed to determine how much encroachment a track on the disk can sustain from an adjacent track without compromising the integrity of the data stored in the track. However, as the proximity of tracks increases, the results of such track placement tests become less reliable. In addition, the closer proximity of tracks makes it more difficult to determine whether the head and disk meet particular specifications.

Figure 1:
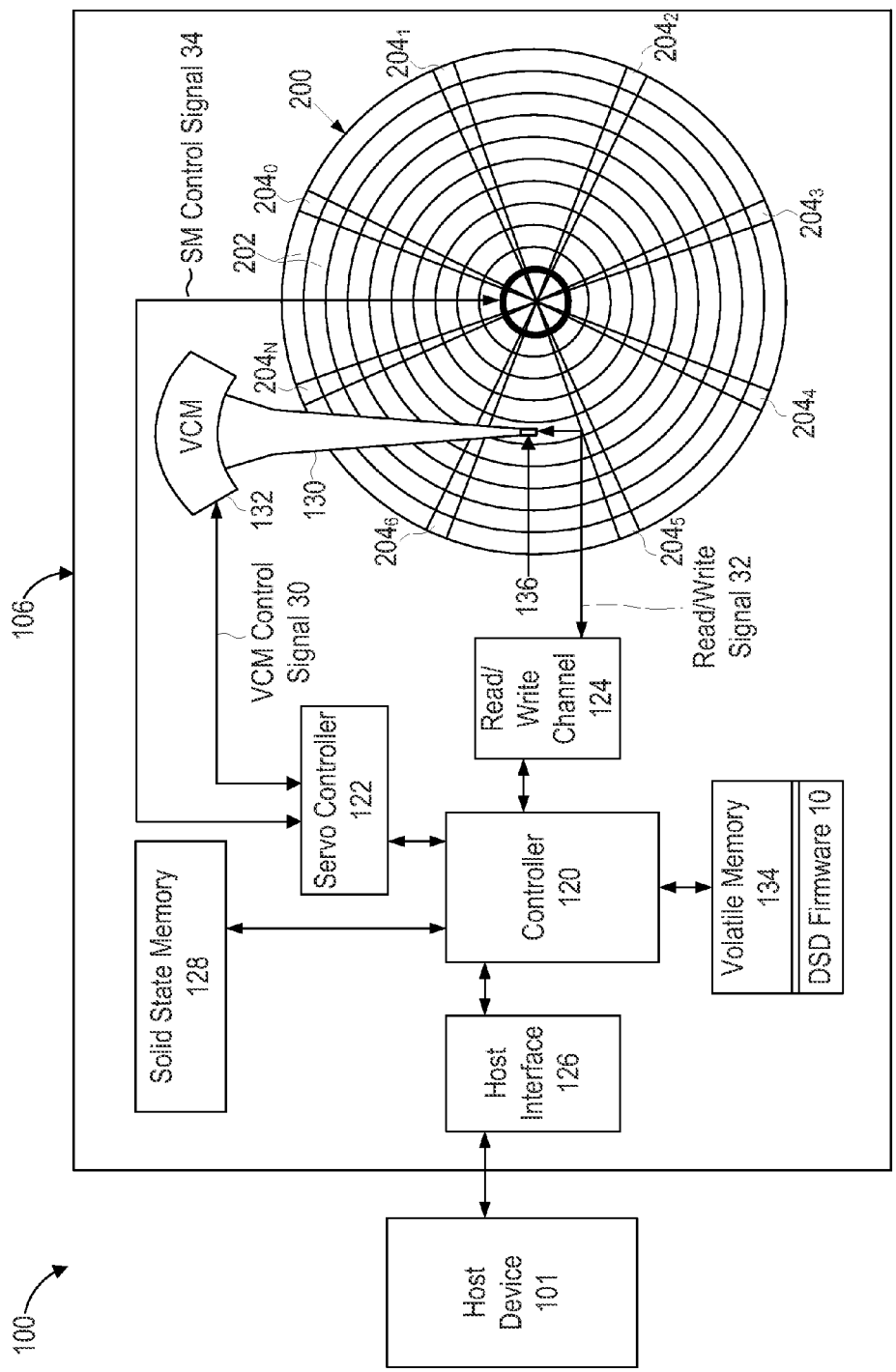
FIG. 1 is a block diagram depicting a Data Storage Device (DSD) according to an embodiment.

FIG. 1 illustrates a block diagram of DSD 106 according to an embodiment. In the example of FIG. 1, DSD 106 is part of computer system 100 which includes host device 101 and DSD 106. Computer system 100 can be, for example, a computer system (e.g., desktop, mobile/laptop, tablet, smartphone, etc.) or other electronic device such as a digital video recorder (DVR). In this regard, computer system 100 may be a stand-alone system or part of a network, which can, for example, be a local or wide area network or the Internet.

In the example of FIG. 1, host device 101 can interface with DSD 106 as part of a manufacturer's product design or quality control process. One part of the testing can include a track measurement test to tune the placement of tracks on a disk of DSD 106 or to determine whether certain components of DSD 106 meet specifications. However, conventional track placement tests such as current "squeeze to death" or "Off-Track Read Capability (OTRC)" tests often fail to provide reliable results when tracks are in close proximity to each other or when tracks overlap each other as in a Shingled Magnetic Recording (SMR) application.

In view of the foregoing, the disclosed processes for track measurement ordinarily improve the accuracy and repeatability of track measurement tests by accounting for variations in track placement caused by Track Mis-Registration (TMR), which is discussed in more detail below with reference to FIGS. 2A to 2D.

The disclosed track measurement processes may be performed by DSD 106 or by host device 101, or by a combination of both host device 101 and DSD 106. In addition, those of ordinary skill in the art will appreciate that computer system 100 and DSD 106 can include more or less than those elements shown in FIG. 1 and that the processes disclosed for track measurement may be implemented in other environments.

As shown in FIG. 1, DSD 106 includes controller 120 which can include circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 120 can include a System on a Chip (SoC).

Host interface 126 is configured to interface DSD 106 with host device 101 and may interface according to a standard such as, for example, PCI express (PCIe), Serial Advanced Technology Attachment (SATA), or Serial Attached SCSI (SAS). Although FIG. 1 depicts the co-location of host device 101 and DSD 106, in other embodiments the two need not be physically co-located. In such embodiments, DSD 106 may be located remotely from host device 101 and interface with host device 101 via a network interface.

DSD 106 also optionally includes solid state memory 128 for storing data, which stores data that can be retained across power cycles (i.e., after turning DSD 106 off and on). In this regard, DSD 106 can be considered a "hybrid drive" in that it includes multiple types of storage media. However, as will be appreciated by those of ordinary skill in the art, other embodiments may not include solid state memory 128, and may instead only include rotating magnetic disks such as disk 200 as a non-volatile memory.

While the description herein refers to solid state memory generally, it is understood that solid state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single-Level Cell (SLC) memory, Multi-Level Cell (MLC) memory, or any combination thereof), NOR memory, EEPROM, Ferroelectric Memory (FeRAM), Magnetoresistive RAM (MRAM), other discrete Non-Volatile Memory (NVM) chips, or any combination thereof.

In the example of FIG. 1, disk 200 is rotated by a spindle motor (not shown). DSD 106 also includes head 136 connected to the distal end of actuator 130 which is rotated by Voice Coil Motor (VCM) 132 to position head 136 in relation to disk 200. Servo controller 122 includes circuitry to control the position of head 136 and the rotation of disk 200 using VCM control signal 30 and SM control signal 34, respectively. Read/write channel 124 includes circuitry for encoding data to be written to disk 200 and for decoding data read from disk 200.

As understood by those of ordinary skill in the art, disk 200 may form part of a disk pack with additional disks radially aligned below disk 200. In addition, head 136 may form part of a head stack assembly including additional heads with each head arranged to read data from and write data to a corresponding surface of a disk in a disk pack.

Disk 200 includes a number of radially spaced, concentric tracks 202 with each track 202 divided into a plurality of sectors that are spaced circumferentially along track 202. The sectors may be used to store user data or other information.

Disk 200 also includes a plurality of angularly spaced servo wedges $204_0$-$204_N$, each of which may include embedded servo information that can be read by head 136 to determine a position of head 136 over disk 200. For example, each servo wedge $204_0$-$204_N$ may include a pattern of alternating magnetic transitions (servo burst), which may be read by head 136 and used by servo controller 122 to estimate the position of head 136 relative to disk 200.

Volatile memory 134 can include, for example, a Dynamic Random Access Memory (DRAM) which can be used by DSD 106 to temporarily store data. Data stored in volatile memory 134 can include data read from NVM media (e.g., disk 200 or solid state memory 128) and data to be written to NVM media. As shown in FIG. 1, volatile memory 134 can also store DSD firmware 10 which includes computer-executable instructions that control operation of DSD 106 when executed by controller 120.

In operation, host interface 126 receives commands from host device 101 via host interface 126 for reading data from and writing data to non-volatile memory such as solid-state memory 128 or disk 200. In response to a write command from host device 101, controller 120 may buffer the data to be written for the write command in volatile memory 134.

For data to be written to disk 200, read/write channel 124 encodes the buffered data into write signal 32 which is provided to head 136 for magnetically writing data in sectors on disk 200.

In response to a read command for data stored on disk 200, controller 120 positions head 136 via servo controller 122 to magnetically read the data stored in sectors on disk 200. Head 136 sends the read data as read signal 32 to read/write channel 124 for decoding and the data is buffered in volatile memory 134 for transferring to host device 101 via host interface 126.

Figure 2A:
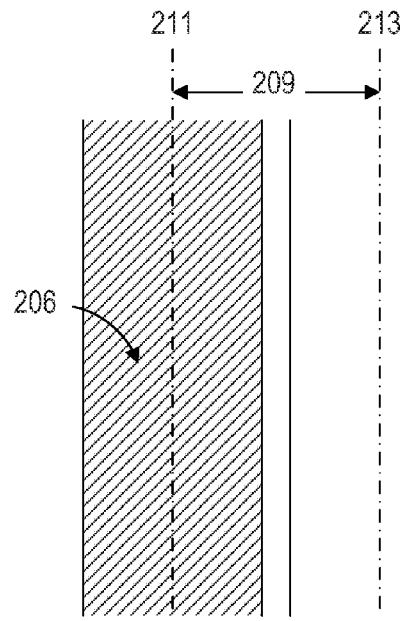
FIG. 2A is a conceptual diagram of examples of a test track and an adjacent track without Track Mis-Registration (TMR) according to an embodiment.
Figure 2B:
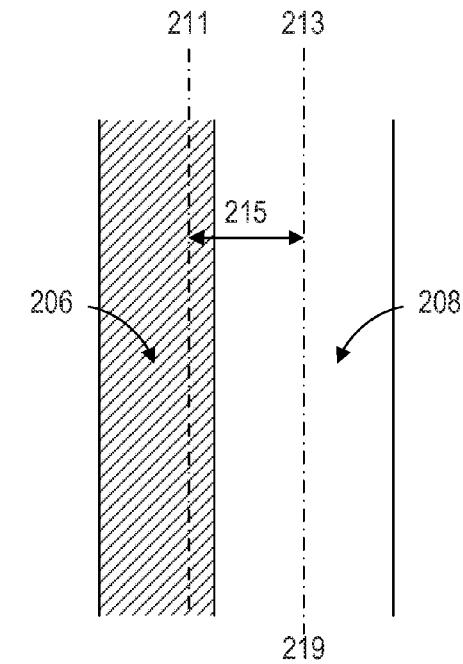
FIG. 2B is a conceptual diagram illustrating rewriting of the adjacent track of FIG. 2A at a decreased offset distance from the test track of FIG. 2A according to an embodiment.
Figure 2C:
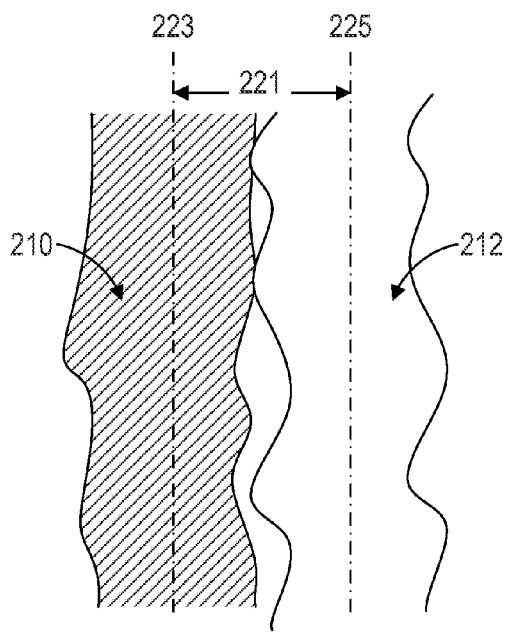
FIG. 2C is a conceptual diagram of examples of a test track and an adjacent track that include TMR according to an embodiment.

FIG. 2A provides an idealized diagram of test track 206 and adjacent track 208 written without TMR, while FIG. 2C illustrates a more realistic view of test track 210 and adjacent track 212 written with TMR. When writing data in a track 202, servo controller 122 attempts to keep head 136 positioned over a center of the track (e.g., center lines 211 and 213 in FIG. 2A) using information from servo wedges $204_0$-$204_N$. In practice, numerous variables such as, for example, system noise, characteristics of head 136, flight dynamics of head 136 floating over disk 200, or resonant frequencies of the servo system can result in position errors when attempting to keep head 136 positioned over a center of the track. This position error can generally be referred to as write TMR and is conceptually illustrated in FIGS. 2C and 2D by the wavy boundaries of test track 210 and adjacent track 212.

The write TMR can contribute to errors when performing track measurements where the offset between a test track and an adjacent track are gradually decreased, such as in a squeeze to death test or a zero OTRC test. In such tests, data is read from a test track with the adjacent track at various offset distances from the test track. In addition to the variance caused by the write TMR discussed above, a read TMR caused by similar factors when reading data from the test track can exacerbate the reliability of conventional track measurement tests.

In a conventional squeeze to death test, the offset between the adjacent track and the test track is gradually decreased until an error has been confirmed for one of the sectors in the track. The error may be detected using an Error Correcting Code (ECC) of the sector or by other methods known in the art. This conventional way of performing a squeeze to death test generally measures the amount of encroachment or squeeze a track can handle without errors. This test will indicate an acceptable encroachment distance based on the sector in the test track that is the most prone to an error from the interference of the adjacent track (i.e., the "dead sector"). The repeatability of such a test is typically poor since the dead sector may change from one run of the test to the next. Moreover, the foregoing test does not account for position error caused by write TMR and read TMR which have a greater effect on results when tracks are to be located in close proximity to or partially overlapping each other (i.e., an SMR application).

In a conventional OTRC test, the amount of encroachment or squeeze from an adjacent track that a test track can handle is determined by gradually decreasing the offset distance between the adjacent track and the test track while reading data from the test track from an OTRC position outside the test track. The amount of encroachment or squeeze that the test track can handle is set at the point where no data can be read from the test track from the OTRC position. In other words, the distance the adjacent track is offset from the test track is gradually decreased until all of the sectors of the test track have a zero OTRC where no data can be read from the sectors from the OTRC position.

As with the conventional squeeze to death test discussed above, the conventional OTRC test does not account for TMR when reading and writing data. As a result, the conventional OTRC test often provides inaccurate results because not all of the sectors in the test track reach a zero OTRC at the same time due to TMR. The results of a conventional OTRC test are therefore usually artificially high since read errors will be encountered for many of the sectors before the adjacent track is positioned such that all of the sectors have a zero OTRC.

With reference to FIG. 2A, test track 206 is initially offset from adjacent track 208 by offset distance 209 which is measured between the center of test track 206 at centerline 211 and the center of adjacent track 208 at centerline 213. In FIG. 2B, the offset distance between test track 206 and adjacent track 208 has been decreased to offset distance 215 between centerline 211 and centerline 213.

In some implementations, an offset value may be used to represent the change in offset between the test track and the adjacent track as, for example, a percentage of a track pitch change between the test track and the adjacent track or an amount of overlap of the adjacent track onto the test track.

Figure 2D:
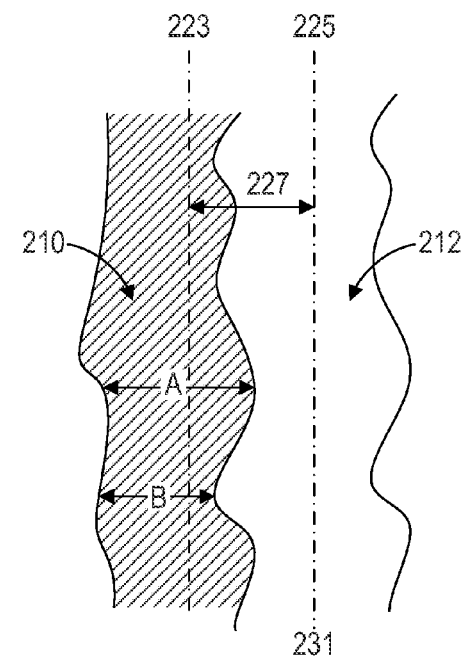
FIG. 2D is a conceptual diagram illustrating rewriting of the adjacent track of FIG. 2C at a decreased offset distance from the test track of FIG. 2C according to an embodiment.

In the example of FIG. 2C with the effects of write TMR, test track 210 and adjacent track 212 are initially separated by an offset distance 221 between centerlines 223 and 225. In FIG. 2D, the offset distance between test track 210 and adjacent track 212 has been decreased to offset distance 227 between centerline 223 and centerline 225.

As shown by the differences in distances A and B in FIG. 2D, the amount of test track 210 not overlapped by adjacent track 212 varies depending on the particular location along the tracks. In addition, the amount of test track 210 subjected to a magnetic field from writing adjacent track 212 varies. Such variances can generally reduce the accuracy and repeatability of conventional track measurements, such as in the conventional squeeze to death test or conventional zero OTRC test discussed above.

Figure 3A:
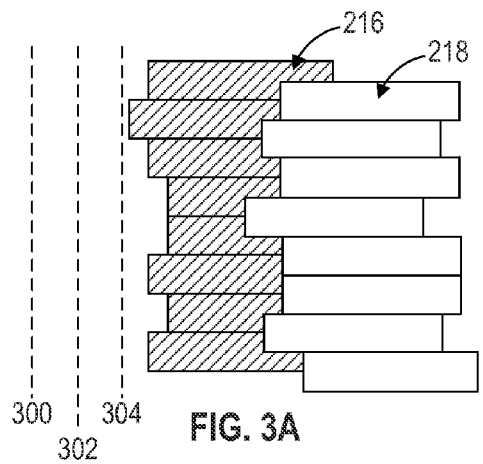
FIG. 3A is a conceptual diagram of an initial position of a test track and an adjacent track with the reading of a plurality of sectors of the test track at varying Off-Track Read Capability (OTRC) positions according to an embodiment.
Figure 3B:
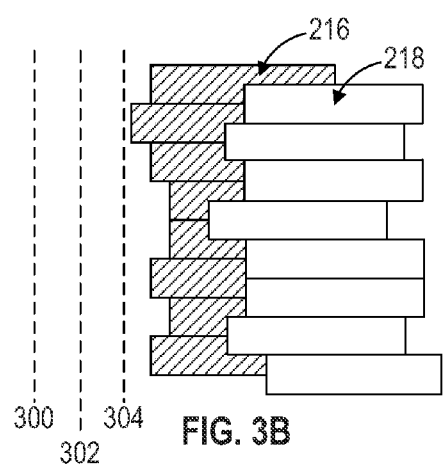
FIG. 3B is a conceptual diagram illustrating the rewriting of the adjacent track of FIG. 3A with the reading of the plurality of sectors of the test track at varying OTRC positions according to an embodiment.
Figure 3C:
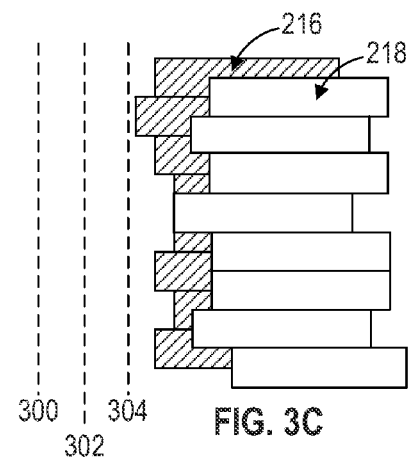
FIG. 3C is a conceptual diagram illustrating the rewriting of the adjacent track of FIG. 3B and the reading of the plurality of sectors of the test track at varying OTRC positions according to an embodiment.

FIGS. 3A to 3C illustrate the rewriting of adjacent track 218 and the reading of a plurality of sectors in test track 216 at varying OTRC positions according to an embodiment. As shown in FIG. 3A, the plurality of sectors of test track 216 are indicated by the stacked rectangles forming test track 216. Adjacent track 218 similarly includes a plurality of sectors.

Test track 216 and adjacent track 218 are initially located with adjacent track 218 partially overlapping test track 216. Such an initial overlap may be used to tune a track format in an SMR implementation. In this example, an amount of overlap can be gradually increased to determine an amount of track overlap for SMR tracks to better utilize an area of the disk surface.

As indicated in FIG. 3A, head 136 reads data from three different OTRC positions outside of test track 216 at OTRC positions 300, 302 and 304. Generally, more errors are encountered as head 136 reads data from OTRC positions farther from test track 216. The order of OTRC positions from which head 136 reads data can vary. In addition, other embodiments may include a different number of OTRC positions.

An OTRC value for each sector can be determined based on whether the sector meets a criterion for correctly reading data from the sector at the different OTRC positions. Such a criterion can include whether head 136 can correctly read data from the sector in a certain number of read attempts or revolutions of disk 200. In one implementation, a sector meets the criterion if data can be correctly read from the sector when head 136 is at the OTRC position three out of five times. Other criterion for correctly reading data from the sector may be used in other embodiments. The correctness of the data read from the sector can be determined by evaluating an ECC of the sector or by other methods known in the art for checking data.

After determining whether each of the plurality of sectors passes or fails the criterion at a first OTRC position, such as OTRC position 300, head 136 is moved to a second OTRC position such as OTRC position 302 and the processes of determining whether each of the plurality of sectors in test track 216 meet the criterion repeats for the new location of adjacent track 218. Head 136 is then moved to a third OTRC position such as OTRC position 304 where it is determined whether data can be correctly read from each sector in test track 216. In general, the farther the OTRC position is from test track 216, the more likely that read errors will occur when attempting to read test track 216 from the OTRC position.

As noted above, the order of the OTRC positions can vary such that head 136 may move from OTRC position 304 to OTRC position 300 in other examples. In addition, other embodiments may include more or less OTRC positions than those shown in FIGS. 3A to 3C.

An OTRC value is determined for each sector in test track 216 by evaluating whether the sector met the criterion for correctly reading data at the different OTRC positions. In one example implementation, the OTRC value can include a ratio of the number of successful reads to the total number of read attempts from the different OTRC distances.

FIG. 3B illustrates a second iteration of the test performed in FIG. 3A where the offset distance of adjacent track 218 has been decreased such that more of adjacent track 218 overlaps test track 216. When the offset distance of adjacent track 218 decreases, it is generally more likely that reading data from test track 216 from the OTRC positions will not meet the criterion for correctly reading data. This can be due to the effect of Adjacent Track Interference (ATI) where the magnetic field from writing the data of adjacent track 218 affects or corrupts the data stored in test track 216. In addition, in the SMR example of FIGS. 3A to 3C, the overlap of adjacent track 218 onto test track 216 decreases the area of test track 216 available for reading such that reading test track 216 from an off-track position becomes more error prone.

FIG. 3C shows a third iteration where the offset distance of adjacent track 218 has been further decreased from that of FIG. 3B. With the track placement of FIG. 3C, the OTRC for the sectors of test track 216 further declines. This is shown by the progressive decline in OTRC values in FIG. 4 as the offset distance is decreased from FIG. 3A to FIG. 3C.

Figure 4:
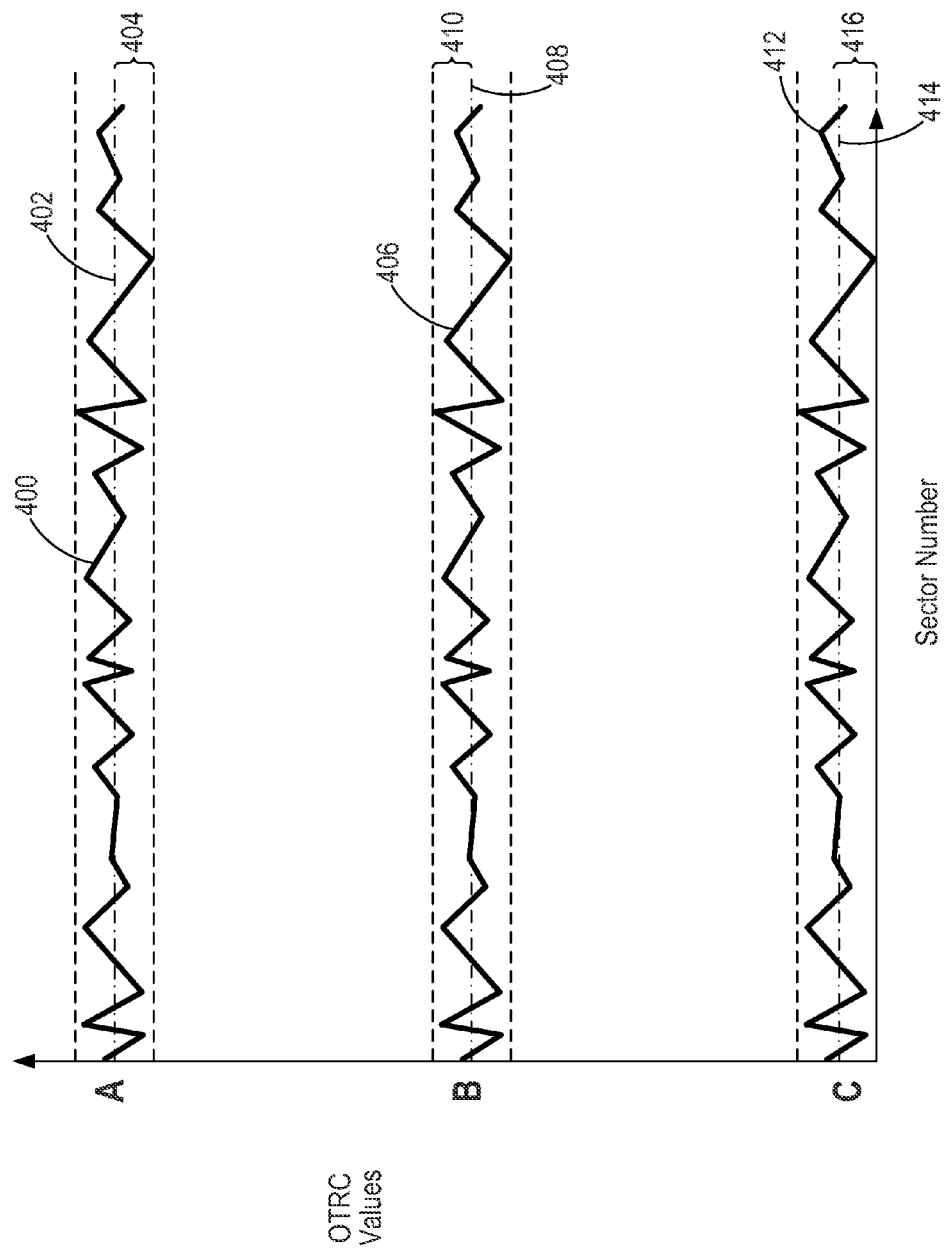
FIG. 4 depicts three graphs of OTRC values corresponding to the diagrams of FIGS. 3A, 3B and 3C according to an embodiment.

FIG. 4 depicts three graphs of OTRC values corresponding to the track placements of FIGS. 3A, 3B and 3C. As shown in FIG. 4, the OTRC values are highest for the arrangement of FIG. 3A, which is shown by line 400 extending across the sector numbers of the x-axis.

As the offset distance of adjacent track 218 is decreased to that of FIG. 3B, the corresponding OTRC values for the sectors in test track 216 fall to line 406 in FIG. 4. The OTRC values for the sectors decrease even further with the arrangement of FIG. 3C as shown by line 412 in FIG. 4.

FIG. 4 also depicts the average OTRC value and a predetermined multiple of the standard deviation of OTRC values of the sectors for each of the track arrangements of FIGS. 3A to 3C. Specifically, the average OTRC values for the track placements of FIGS. 3A, 3B and 3C are shown by lines 402, 408 and 414, respectively. The predetermined multiple of standard deviations for the OTRC values are shown at 404, 410 and 416. The predetermined multiple can vary in different implementations based on design considerations. In some implementations, the predetermined multiple can be 1 such that the predetermined multiple of the standard deviation is simply the standard deviation.

In one embodiment, adjacent track 218 is repeatedly rewritten at decreasing offset distances from test track 216 until the average OTRC value for the sectors in the test track are not greater than or equal to a predetermined multiple of the standard deviation of the OTRC values. This track positioning is shown in FIG. 3C where the average OTRC value (i.e., line 414 in FIG. 4) is less than the predetermined multiple of the standard deviation of the OTRC values (i.e., 416 in FIG. 4). As will be discussed in more detail with reference to FIG. 7 below, considering the standard deviation of the OTRC values allows for more accurate and repeatable results than conventional tests by accounting for track variances such as TMR. In addition, consideration of the average OTRC value allows the track positioning to be based on a plurality of sectors in the test track rather than only on a worst case dead sector in the test track.

Figure 5:
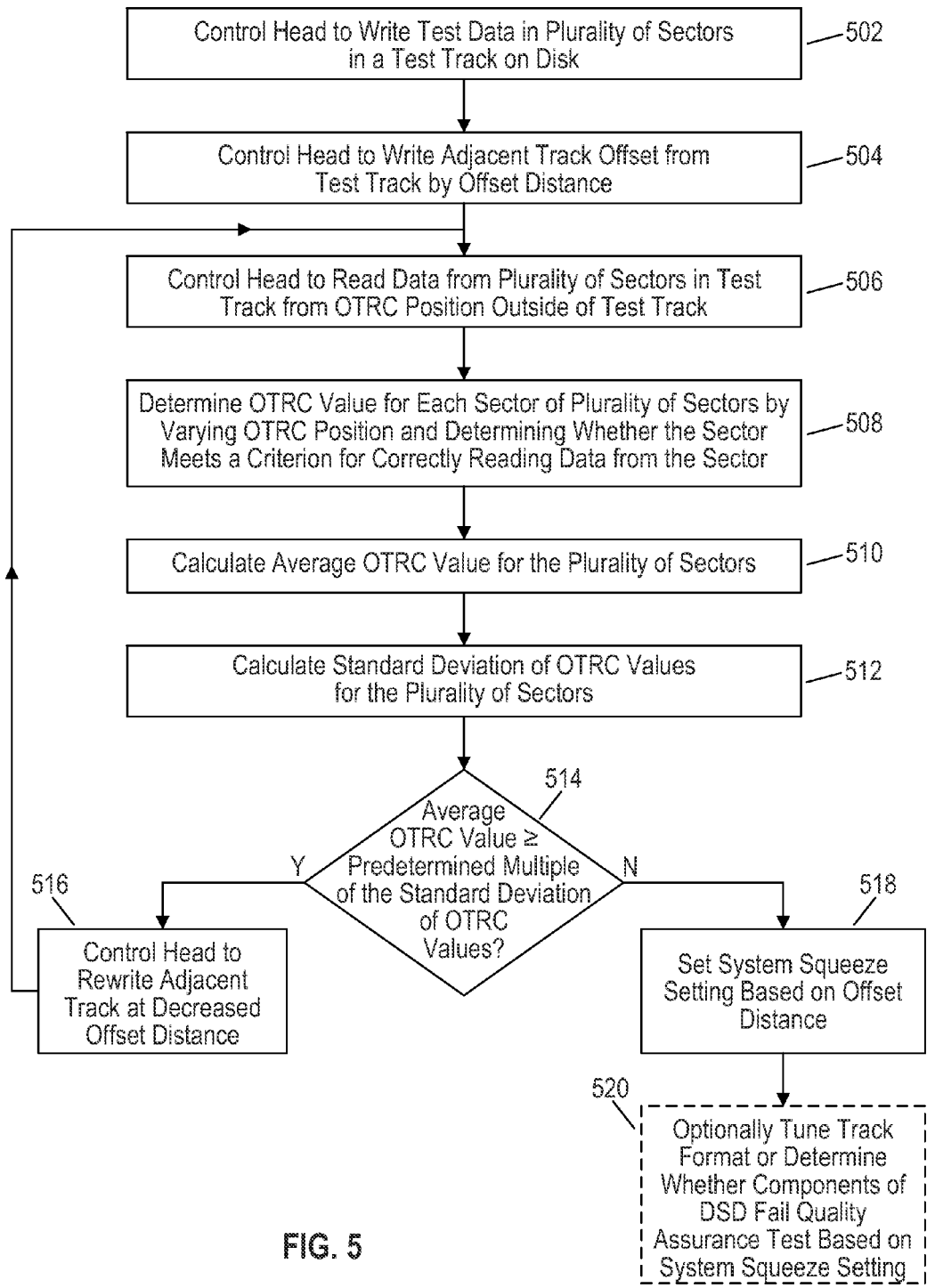
FIG. 5 is a flowchart for a track measurement process for a system squeeze setting according to an embodiment.

FIG. 5 is a flowchart for a track measurement process that can be performed by controller 120 in executing DSD firmware 10 according to an embodiment. In other embodiments, the process of FIG. 5 may be performed by host device 101 or by a combination of controller 120 and host device 101. The process of FIG. 5 may also be performed for a particular disk surface or for a number of zones of tracks on a disk surface.

In block 502, controller 120 controls head 136 via servo controller 122 to write test data in a plurality of sectors in a test track (e.g., test track 216 in FIG. 3A) on disk 200. Controller 120 also controls head 136 in block 504 to write an adjacent track (e.g., adjacent track 218 in FIG. 3A) offset from the test track by an offset distance.

In block 506, controller 120 controls head 136 to read data from the plurality of sectors in the test track from an OTRC position outside of the test track. An OTRC value is determined for each of the plurality of sectors in block 508 by varying the OTRC position and determining whether the sector meets a criterion for correctly reading data from the sector. The OTRC positions may include a series of steps or distances from the test track or its centerline. As noted above, the criterion for correctly reading data from the test track can include determining whether data can be read from a particular sector without errors for a predetermined number of read attempts. The OTRC value can represent the OTRC for the particular sector in the test track. In one implementation, the OTRC value can include a ratio of the number of successful reads to the total number of read attempts at the different OTRC positions. Other known methods of calculating an OTRC value can be used in other implementations.

In block 510, controller 120 calculates an average OTRC value for the plurality of sectors in the test track. In the example track placement of FIG. 3A, this can correspond to the average OTRC value at line 402 in FIG. 4.

In block 512, controller 120 calculates a standard deviation of the OTRC values for the plurality of sectors in the test track. Controller 120 in block 514 determines whether the average OTRC value is greater than or equal to a predetermined multiple of the standard deviation calculated in block 512. The predetermined multiple can be based on design criteria such as, for example, to adjust the sensitivity to variations in track boundaries from TMR. In some implementations, the predetermined multiple can be 1 so that the comparison in block 514 determines whether the average OTRC value is greater than or equal to the standard deviation of the OTRC values.

If it is determined in block 514 that the average OTRC value is greater than or equal to the predetermined multiple of the standard deviation, controller 120 in block 516 controls head 136 via servo controller 122 to rewrite the adjacent track at a decreased offset distance from the test track. The process of FIG. 5 then returns to block 506 to perform blocks 506 to 514 with the rewritten adjacent track.

On the other hand, if it is determined in block 514 that the average OTRC value is not greater than or equal to the predetermined multiple of the standard deviation, controller 120 in block 518 sets a system squeeze setting based on the current offset distance for the adjacent track. In some embodiments, controller 120 may set the system squeeze setting using a curve fit or linear interpolation using the current offset distance. In block 520, the system squeeze setting can be optionally used, as indicated by the dashed box, to tune a track format for disk 200 or to determine whether components of DSD 106 fail a quality assurance test.

Figure 6:
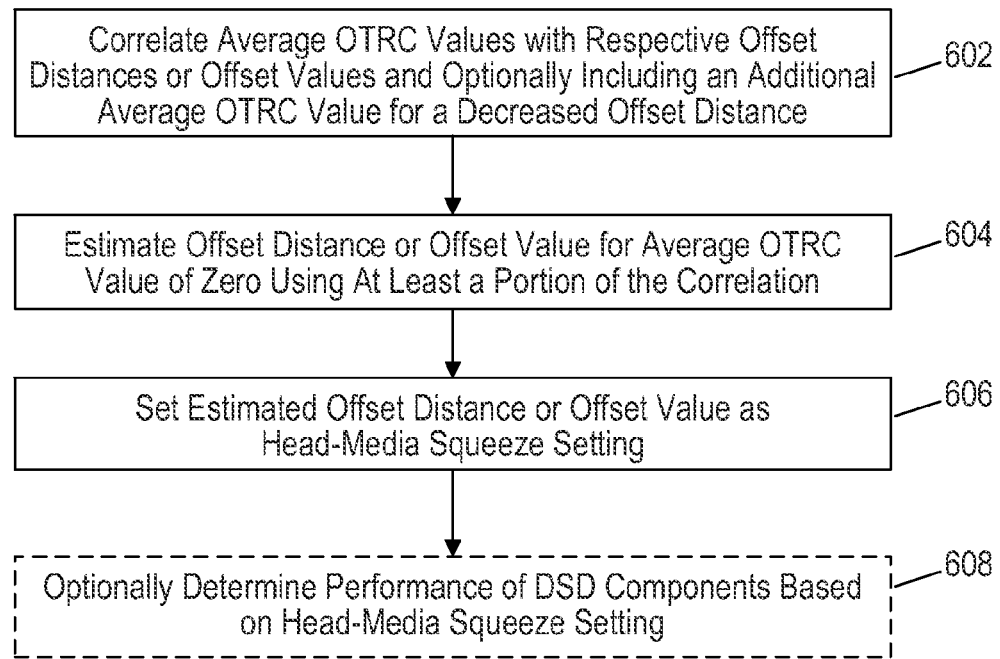
FIG. 6 is a flowchart for a track measurement process for a head-media squeeze setting according to an embodiment.

FIG. 6 is a flowchart for a track measurement process that can be performed by controller 120 in executing DSD firmware 10 to identify a head-media squeeze setting according to an embodiment. In other embodiments, the process of FIG. 6 may be performed by host device 101 or by a combination of controller 120 and host device 101. The process of FIG. 6 may also be performed for a particular disk surface or for a number of zones of tracks on a disk surface.

The head-media squeeze setting can be used to determine whether head 136 and disk 200 meet particular specifications without most of the influence of TMR caused by the servo system. In addition, the following process of FIG. 6 uses statistics from the plurality of sectors in the test track so as not to have its results dominated by a worst case dead sector. The process of FIG. 6 can occur after the process of FIG. 5 in order to use the average OTRC values calculated in block 510 as discussed above.

In block 602, controller 120 correlates different average OTRC values calculated in block 510 of FIG. 5 with their respective offset distances or corresponding offset values. Controller 120 in block 602 may optionally include an additional average OTRC value for a decreased offset distance. In such an implementation, blocks 516, 506, 508, and 510 of FIG. 5 are performed to rewrite an additional adjacent track and calculate an additional average OTRC value after it is determined that the previous average OTRC value is not greater than or equal to the predetermined multiple of the standard deviation in block 514. The additional average OTRC value can then be included in the correlation between the different average OTRC values and their respective offset distances or offset values.

Figure 7:
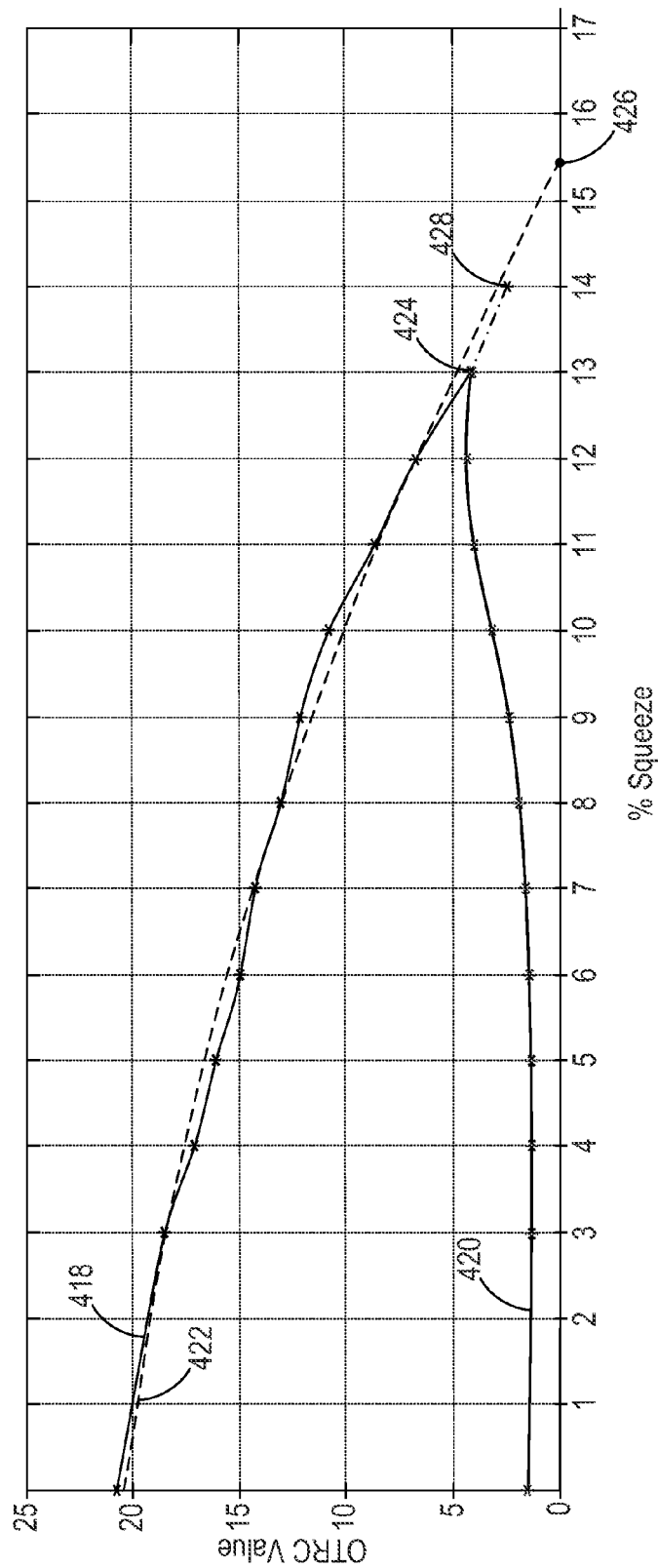
FIG. 7 is a graph depicting a correlation between different average OTRC values and their respective offset values according to an embodiment.

An example of such a correlation is depicted in the graph of FIG. 7. As shown in FIG. 7, the average OTRC values are plotted as curve 418 for different offset values corresponding to offset distances for the adjacent track. In the example of FIG. 7, the offset values along the x-axis represent a percentage of squeeze or encroachment by the adjacent track toward the test track.

The predetermined multiple of the standard deviations of the OTRC values are also plotted as curve 420 in FIG. 7 for the different offset values. The intersection of curve 420 and curve 418 can indicate a system squeeze setting where the average OTRC value is less than or equal to the predetermined multiple of the standard deviation of the OTRC values. In the example of FIG. 7, this occurs at an offset value or percent of squeeze of 13%. As noted above, an offset value can be represented in different ways such as a percentage of a certain offset distance, as an amount of overlap by the adjacent track, or as a change in position of the adjacent track. An additional average OTRC value 428 is also shown in FIG. 7 at a decreased offset value or percent of squeeze of 14%.

Returning to the process of FIG. 6, controller 120 in block 604 estimates an offset value or offset distance for an average OTRC value of zero using at least a portion of the correlation of block 602. This estimation may be performed by interpolation, a linear curve fit, or by approximating curve 418 with a polynomial function (e.g., a quadratic function) to estimate where curve 418 would reach an average OTRC value of zero. Such an estimation is depicted graphically in FIG. 7 with curve 422 approximating the average OTRC values curve 418 using a quadratic fit of all of the average OTRC values including additional average OTRC value 428.

In other embodiments, controller 120 may estimate where curve 418 would reach an average OTRC value of zero using a linear fit of a portion of the correlation between the average OTRC values and their respective offset distances or offset values. For example, controller 120 may use a linear fit of the last three average OTRC values including additional OTRC value 428 to estimate the offset distance or offset value for an average OTRC value of zero.

The point at which curve 422 reaches the x-axis with an average OTRC value of zero at offset value 426 represents an offset value that can be achieved without significant influence of TMR from the servo system. By reducing the influence of servo TMR, it is ordinarily possible to more accurately determine specifications for head 136 and disk 200.

In block 606 of FIG. 6, controller 120 sets the estimated offset distance or offset value (e.g., offset value 426 in FIG. 7) as a head-media squeeze setting. In block 608, a performance of DSD components such as head 136 or disk 200 can optionally be determined based on the head-media setting. As noted above, the head-media setting can be used to test head 136 and disk 200 while reducing the effects of TMR in the results. In this regard, the difference between the system squeeze setting (e.g., approximately 13 in FIG. 7) and the head-media squeeze setting (e.g., approximately 15.5 in FIG. 7) can represent the effect of track variation such as TMR in the track measurements.

Tests conducted using the foregoing track measurement processes have shown a significant reduction in study variation when comparing the above-described track measurement processes to a conventional squeeze to death test.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
a disk for storing data;
a head for reading and writing data on the disk; and
a controller configured to:
control the head to write test data in a plurality of sectors in a test track on the disk;
control the head to write an adjacent track on the disk that is offset from the test track by an offset distance;
control the head to read data from the plurality of sectors in the test track from an Off-Track Read Capability (OTRC) position on the disk outside of the test track;
determine an OTRC value for each sector of the plurality of sectors in the test track by varying the OTRC position and determining whether the sector meets a criterion for correctly reading data from the sector;
calculate an average OTRC value for the plurality of sectors in the test track;
calculate a standard deviation of the OTRC values for the plurality of sectors in the test track;
determine whether the average OTRC value for the plurality of sectors is greater than or equal to a predetermined multiple of the standard deviation of the OTRC values for the plurality of sectors; and if it is determined that the average OTRC value is greater than or equal to the predetermined multiple of the standard deviation of the OTRC values, control the head to rewrite the adjacent track at a decreased offset distance.

2. The DSD of claim 1, wherein the controller is further configured to control the head to write the adjacent track such that a portion of the adjacent track overlaps the test track.

3. The DSD of claim 1, wherein the controller is further configured to set a system squeeze setting based on the offset distance of the adjacent track if it is determined that the average OTRC value is not greater than or equal to the predetermined multiple of the standard deviation of the OTRC values.

4. The DSD of claim 3, wherein the system squeeze setting is used to tune a track format on the disk or to determine whether components of the DSD fail a quality assurance test.

5. The DSD of claim 1, wherein the controller is further configured to control the head to iteratively rewrite the adjacent track at decreasing offset distances until the average OTRC value for the plurality of sectors is determined to not be greater than or equal to the predetermined multiple of the standard deviation of the OTRC values for the plurality of sectors.

6. The DSD of claim 5, wherein the controller is further configured to:
correlate different average OTRC values with their respective offset distances or offset values representing the offset distances;
estimate an offset distance or offset value for an average OTRC value of zero using at least a portion of the correlation between the different average OTRC values and their respective offset distances or offset values; and
set the estimated offset distance or offset value as a head-media squeeze setting.

7. The DSD of claim 6, wherein the controller is further configured to estimate the offset distance or offset value for an average OTRC value of zero using a quadratic fit of the at least a portion of the correlation between the different average OTRC values and their respective offset distances or offset values.

8. The DSD of claim 6, wherein the controller is further configured to estimate the offset distance or offset value for an average OTRC value of zero using a linear fit of the at least a portion of the correlation between the different average OTRC values and their respective offset distances or offset values.

9. The DSD of claim 6, wherein the controller is further configured to:
control the head to rewrite an additional adjacent track at a decreased offset distance if the average OTRC value for the plurality of sectors is determined to not be greater than or equal to the predetermined multiple of the standard deviation of the OTRC values for the plurality of sectors;
calculate an additional average OTRC value for the decreased offset distance; and
include the additional average OTRC value in the correlation between different average OTRC values and their respective offset distances or offset values for estimating the offset distance or offset value for an average OTRC value of zero.

10. The DSD of claim 6, wherein the DSD further comprises a servo controller for controlling a position of the head relative to the disk, and wherein a difference between the head-media squeeze setting and the system squeeze setting includes a position error related to a track mis-registration.

11. A method for measuring track placement on a disk of a Data Storage Device (DSD), the method comprising:
writing test data in a plurality of sectors in a test track on the disk;
writing an adjacent track on the disk that is offset from the test track by an offset distance;
reading data from the plurality of sectors in the test track from an Off-Track Read Capability (OTRC) position on the disk outside of the test track;
determining an OTRC value for each sector of the plurality of sectors in the test track by varying the OTRC position and determining whether the sector meets a criterion for correctly reading data from the sector;
calculating an average OTRC value for the plurality of sectors in the test track;
calculating a standard deviation of the OTRC values for the plurality of sectors in the test track;
determining whether the average OTRC value for the plurality of sectors is greater than or equal to a predetermined multiple of the standard deviation of the OTRC values for the plurality of sectors; and
if it is determined that the average OTRC value is greater than or equal to the predetermined multiple of the standard deviation of the OTRC values, rewriting the adjacent track at a decreased offset distance.

12. The method of claim 11, further comprising writing the adjacent track such that a portion of the adjacent track overlaps the test track.

13. The method of claim 11, further comprising setting a system squeeze setting based on the offset distance of the adjacent track if it is determined that the average OTRC value is not greater than or equal to the predetermined multiple of the standard deviation of the OTRC values.

14. The method of claim 13, further comprising tuning a track format on the disk based on the system squeeze setting.

15. The method of claim 13, further comprising determining whether components of the DSD fail a quality assurance test based on the system squeeze setting.

16. The method of claim 10, further comprising iteratively rewriting the adjacent track at decreasing offset distances until the average OTRC value for the plurality of sectors is determined to not be greater than or equal to the predetermined multiple of the standard deviation of the OTRC values for the plurality of sectors.

17. The method of claim 16, further comprising:
correlating different average OTRC values including the last average OTRC value with their respective offset distances or offset values representing the offset distances;
estimating an offset distance or offset value for an average OTRC value of zero using at least a portion of the correlation between the different average OTRC values and their respective offset distances or offset values; and
setting the estimated offset distance or offset value as a head-media squeeze setting.

18. The method of claim 17, further comprising determining performance of components of the DSD based on the head-media squeeze setting.

19. The DSD of claim 17, further comprising estimating the offset distance or offset value for an average OTRC value of zero using a quadratic fit of the at least a portion of the correlation between the different average OTRC values and their respective offset distances or offset values.

20. The DSD of claim 17, further comprising estimating the offset distance or offset value for an average OTRC value of zero using a linear fit of the at least a portion of the correlation between the different average OTRC values and their respective offset distances or offset values.

21. The method of claim 17, further comprising:
rewriting an additional adjacent track at a decreased offset distance if the average OTRC value for the plurality of sectors is determined to not be greater than or equal to the predetermined multiple of the standard deviation of the OTRC values for the plurality of sectors;
calculating an additional average OTRC value for the decreased offset distance; and
including the additional average OTRC value in the correlation between different average OTRC values and their respective offset distances or offset values for estimating the offset distance or offset value for an average OTRC value of zero.

22. The method of claim 17, wherein the DSD further includes a servo controller for controlling a position of the head relative to the disk, and wherein a difference between the head-media squeeze setting and the system squeeze setting includes a position error related to a track mis-registration.

23. A computer-readable medium storing computer-executable instructions for measuring track placement on a disk of a Data Storage Device (DSD), wherein when the computer-executable instructions are executed by a controller or a processor, the computer-executable instructions cause the controller or processor to:

control a head of the DSD to write test data in a plurality of sectors in a test track on the disk;

control the head to write an adjacent track on the disk that is offset from the test track by an offset distance;

control the head to read data from the plurality of sectors in the test track from an Off-Track Read Capability (OTRC) position on the disk outside of the test track;

determine an OTRC value for each sector of the plurality of sectors in the test track by varying the OTRC position and determining whether the sector meets a criterion for correctly reading data from the sector;

calculate an average OTRC value for the plurality of sectors in the test track;

calculate a standard deviation of the OTRC values for the plurality of sectors in the test track;

determine whether the average OTRC value for the plurality of sectors is greater than or equal to a predetermined multiple of the standard deviation of the OTRC values for the plurality of sectors; and if it is determined that the average OTRC value is greater than or equal to the predetermined multiple of the standard deviation of the OTRC values, control the head to rewrite the adjacent track at a decreased offset distance.

* * * * *